US008429529B2

(12) United States Patent
Eguchi et al.

(10) Patent No.: US 8,429,529 B2
(45) Date of Patent: Apr. 23, 2013

(54) PROOFREADING DEVICE, METHOD FOR PROOFREADING DOCUMENT, AND COMPUTER READABLE RECORDING MEDIUM STORING PROOFREADING CONTROL PROGRAM

(75) Inventors: Tatsuya Eguchi, Hachioji (JP); Tetsuhiro Shibata, Sagamihara (JP); Tsutomu Suka, Fussa (JP); Keiichiro Hyodo, Kokubunji (JP); Masayuki Inoue, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 37 days.

(21) Appl. No.: 13/253,883

(22) Filed: Oct. 5, 2011

(65) Prior Publication Data
US 2012/0096347 A1  Apr. 19, 2012

(30) Foreign Application Priority Data

Oct. 15, 2010 (JP) .................................. 2010-232710

(51) Int. Cl.
*G06F 17/28* (2006.01)
(52) U.S. Cl.
USPC ........... 715/268; 715/230; 715/233; 715/256; 715/271
(58) Field of Classification Search ............. 715/230, 715/233, 256, 268, 271
See application file for complete search history.

(56) References Cited

U.S. PATENT DOCUMENTS

| 6,947,598 | B2 * | 9/2005 | Yogeshwar et al. | 382/232 |
| 6,947,995 | B2 * | 9/2005 | Chang et al. | 709/231 |
| 7,035,468 | B2 * | 4/2006 | Yogeshwar et al. | 382/232 |
| 7,318,086 | B2 * | 1/2008 | Chang et al. | 709/217 |
| 8,250,590 | B2 * | 8/2012 | Katari et al. | 719/328 |
| 2002/0167497 | A1 * | 11/2002 | Hoekstra et al. | 345/179 |
| 2006/0061777 | A1 * | 3/2006 | Duggan et al. | 358/1.1 |
| 2006/0200766 | A1 * | 9/2006 | Lakritz | 715/536 |
| 2008/0270087 | A1 * | 10/2008 | Dhoolia et al. | 703/2 |
| 2012/0011170 | A1 * | 1/2012 | Elad et al. | 707/804 |

FOREIGN PATENT DOCUMENTS

| JP | 2005-242763 | 9/2005 |
| JP | 2009-245308 | 10/2009 |

\* cited by examiner

*Primary Examiner* — Doug Hutton, Jr.
*Assistant Examiner* — Andrew Dyer
(74) *Attorney, Agent, or Firm* — Squire Sanders (US) LLP

(57) ABSTRACT

Provided is a proofreading device capable of accepting proofreader's marks, which includes: a user attribute identification section configured to identify an attribute of a user; a storage section configured to store proofreader's mark sets and attributes of users in association with each other and to store intermediate mark set to be used to place the proofreader's marks having the same meaning among the proofreader's sets in correspondence to each other; a proofreader's-mark-set selection section configured to a proofreader's mark set corresponding to the attribute of the user; a proofreader's mark conversion section configured to convert the proofreader's marks, added to a document by a first proofreader, into intermediate marks, to convert the intermediate marks into the proofreader's marks of the proofreader's mark set selected on the basis of the attribute of a second user, and to cause a display section to display the converted proofreader's marks together with the document.

12 Claims, 9 Drawing Sheets

FIG. 7

RELATIONSHIP BETWEEN INTERMEDIATE MARKS
AND DIFFERENT PROOFREADER'S MARK SETS

| INTERMEDIATE MARK NUMBER | MEANING OF PROOFREADER'S MARK | PROOFREADER'S MARK SET 1 | PROOFREADER'S MARK SET 2 | ... |
|---|---|---|---|---|
| 1 | DELETE TEXT | | | |
| 2 | INSERT SPACE BETWEEN TEXTS | | # | |
| 3 | INSERT LEADING BETWEEN LINES | | ─< # | |
| 4 | DELETE SPACE BETWEEN TEXTS | | ⌢ | |
| 5 | DELETE LEADING BETWEEN LINES | | ─<⁄# | |
| ⋮ | ⋮ | ⋮ | ⋮ | ⋮ |

FIG. 9

PROOFREADER'S MARK SET 1

| PROOFREADER'S MARK | MEANING | EXAMPLE OF USE |
|---|---|---|
| (symbols) | REPLACE OR DELETE TEXT OR MARK | 誤字 typo 剰字 delete replace with space / aspace |
| (symbols) | CHANGE FONT OR SIZE | 文字 If 大きさ) 8 points (lc) Lower rom Roman |
| (symbols) | INSERT SPACE OR LEADING | 字間を ひら間く morespace insert space 2 points |
| (symbols) | REDUCE SPACE OR LEADING | ベタ 詰める 字間を off set useless space |
| (symbols) | NEW PARAGRAPH | す。別 end. New |
| ⋮ | ⋮ | ⋮ |

PROOFREADER'S MARK SET 2

| PROOFREADER'S MARK | MEANING | EXAMPLE OF USE |
|---|---|---|
| ⌒ or ••• | DELETE TEXT | to err is human / to err is not human |
| (rom) ↙ | CHANGE FONT OR SIZE | [ abcdef ] (rom) abcdef |
| # —<# | INSERT SPACE OR LEADING | to err#is human  xxxxxxxxxx xxxxxxxxx —<# |
| ⌒ —<⌒# | REDUCE SPACE OR LEADING | to err is hu man  xxxxxxxxxx xxxxxxxxx —<⌒# |
| ¶ | NEW PARAGRAPH | Xxxxx.¶xxxxxxx |
| ⋮ | ⋮ | ⋮ |

PROOFREADING DEVICE, METHOD FOR PROOFREADING DOCUMENT, AND COMPUTER READABLE RECORDING MEDIUM STORING PROOFREADING CONTROL PROGRAM

TECHNICAL FIELD

The present invention relates to a proofreading device and proofreading control program, particularly to a proofreading device and proofreading control program in which proofreader's marks depending on the user attributes are used for proofreading.

BACKGROUND

When publications such as books are to be published, typesetting is conducted based on the manuscript created by an author, and test printing is performed. This test-printed document (called a proof print) is checked by a proofreader who writes proofreader's marks at the positions to be corrected in a proofreading step. These proofreader's marks are employed to perform automatic or manual proofreading process so that a document (called a corrected proof) is created. Then another proofreader compares the corrected document with the document containing proofreader's marks to make sure that the first proofreading is correct. After this proofreading procedure, the second proof-read document (called a second corrected proof) is printed out.

With respect to the aforementioned proofreading, the following Japanese Unexamined Patent Application Publication No. 2009-245308, for example, discloses a document proofreading support method wherein a notation selecting section selects the replacement-from notations corresponding to replacement-to notations in a plurality of fields and the replacement-to notation in a plurality of fields corresponding to the aforementioned replacement-from notations from a proofreading dictionary, and a list creating section extracts a replacement-from notation from the proofreading dictionary for each selected replacement-to notation in a plurality of fields on the basis of the replacement-to notation, thereby creating a notation list containing the replacement-from notation and the replacement-to notation corresponding to this replacement-from notation. This document proofreading support method further includes the steps in which a similarity decision section checks if, among the notation lists over a plurality of fields, the notation group of the notation list in one field and the notation group of the notation list in other fields are similar to each other or not, and a complementation dictionary generating section generates a proofreading complementation dictionary that establishes correspondence between the notation in the notation list in other similar fields and the replacement-to notation in the topmost position of the notation list in one field, whereby a proofreading dictionary of high coverage rate is created.

Further, the following Japanese Unexamined Patent Application Publication No. 2005-242763 discloses a document proofreading device including: an electronic document control section that stores a created electronic document and converts this electronic document into visible image data; an image data printing/storage section that is configured to, when image data is printed on a sheet of paper on the basis of an instruction from an electronic document control means, store the image data in a plurality of IC tags; a proofreading instruction section that gives a proofreading instruction to the document printed on a sheet of paper through operation of the image data stored in a plurality of IC tags for each IC tag; and a proofreading content reading section that reads the proofreading instruction by acquiring the image data modified by the proofreading instruction section, from a plurality of IC tags.

As described above, proofreading process and second proofreading process are essential to create the final document. The proofreading process can be improved by using the aforementioned conventional art, on one hand. On the other hand, the second proofreading process includes the step of comparing the corrected document with the document containing proofreader's marks. The proofreader's marks are based on various forms of personal rules. Thus, when the proofreader and proofreader for the second proofreading use proofreader's marks based on different rules, the proofreader for the second proofreading is required to recognize the proofreader's marks used by the proofreader. This requires much time and includes a higher rate of occurrence of errors. Especially when proofreader's marks based on different rules are to be used by a plurality of proofreaders, the proofreader for the second proofreading is required to recognize the proofreader's marks based on a plurality of rules. This requires much more time for the second proofreading process and involves a greater chance of causing errors.

SUMMARY

In view of forgoing, one embodiment according to one aspect of the present invention is a proofreading device to which proofreader's marks are able to be input, the proof reading device comprising:

a display section configured to display a document;

a user attribute identification section configured to identify an attribute of a user who has logged in the proofreading device;

a storage section configured to store:

at least two proofreader's mark sets, with each proofreader's mark set being in correspondence to the attribute of the user, the at least two proofreader's mark sets including:

a first proofreader's mark set which has a plurality of proofreader's marks according to a first proofreader's mark rule; and a second proofreader's mark set which has a plurality of proofreader's marks according to a second proofreader's mark rule different from the first proofreader's mark rule; and an intermediate mark set which includes a plurality of intermediate marks for making the proofreader's marks having the same meaning among the plurality of proofreader's mark sets correspond to each other;

a proofreader's-mark-set selection section configured to select a proofreader's mark set corresponding to the attribute of the user identified by the user attribute identification section, from the at least two proofreader's mark sets; and a proofreader's mark conversion section configured to recognize a first proofreader's mark added to a document by a first user; then convert the first proofreader's mark into the intermediate mark, and configured to store the converted intermediate mark, as a first intermediate mark, in the storage section in association with the document, wherein when a second user has logged in the proofreading device, the proofreader's mark conversion section converts as a second proofreader's mark the stored first intermediate mark into a second proofreader's mark of the proofreader's mark set selected by the proofreader's-mark-set selection section on the basis of a attribute of the second user, and causes the display section to display the second proofreader's mark together with the document.

According to another aspect of the present invention, another embodiment is a proofreading device to which proofreader's marks are able to be input, the proofreading device comprising:
 a storage section configured to store:
 at least two proofreader's mark sets including:
  a first proofreader's mark set which has a plurality of proofreader's marks according to a first proofreader's mark rule; and
  a second proofreader's mark set which has a plurality of proofreader's marks according to a second proofreader's mark rule different from the first proofreader's mark rule; and
  an intermediate mark set which includes a plurality of intermediate marks for making the proofreader's marks having the same meaning among the proofreader's mark sets correspond to each other; and
 a proofreader's mark conversion section configured to recognize a proofreader's mark added to a document and convert the added proofreader's mark into the intermediate mark, and to store the converted intermediate mark, in association with the document, in the storage section or in another proofreading device which is connected with the proofreading device through a communication network.

According to another aspect of the present invention, another embodiment is a proofreading device which is able to display a proofreader's mark, the device comprising:
 a display section configured to display a document;
 a user attribute identification section configured to identify an attribute of a user who has logged in the proofreading device;
 a storage section configured to store:
 at least two proofreader's mark sets, with each proofreader's mark set being in correspondence to the attribute of the user, the at least two proofreader's mark sets including:
  a first proofreader's mark set which has a plurality of proofreader's marks according to a first proofreader's mark rule; and
  a second proofreader's mark set which has a plurality of proofreader's marks according to a second proofreader's mark rule different from the first proofreader's mark rule; and
  an intermediate mark set which includes a plurality of intermediate marks for making the proofreader's marks having the same meaning among the plurality of proofreader's mark sets correspond to each other;
 a proofreader's-mark-set selection section configured to select a proofreader's mark set corresponding to the attribute of the user identified by the user attribute identification section, from the at least two proofreader's mark sets; and
 a proofreader's mark conversion section configured to obtain an intermediate mark which has been stored in advance in association with a document, to convert the obtained intermediate mark into the proofreader's mark of the proofreader's mark set selected by the proofreader's-mark-set selection section, and to cause the display section to display the converted proofreader's mark together with the document.

According to another aspect of the present invention, another embodiment is a computer readable recording medium storing a proofreading control program which is executed on a proofreading device, wherein the proofreading device is configured to be able to accept a proofreader's mark and stores in advance:
 at least two proofreader's mark sets including:
  a first proofreader's mark set having a plurality of proofreader's marks according to a first proofreader's mark rule; and
  a second proofreader's mark set having a plurality of proofreader's marks according to a second proofreader's mark rule, wherein each of the at least two proofreader's mark set is in correspondence to an attribute of a user; and
 a set of intermediate marks for making proofreader's marks having the same meaning among the proofreader's mark sets correspond to each other,
 the proofreading control program is for making the proofreading device execute:
 a first step for recognizing a proofreader's mark added to a document by a first user, converting the added proofreader's mark into the intermediate mark, and storing in association with the document the converted intermediate mark as a first intermediate mark;
 a second step for identifying an attribute of a logged-in second user;
 a third step for selecting a proofreader's mark set, depending on the identified attribute of the second user from the at least two proofreader's mark sets stored in advance; and
 a fourth step for converting the stored first intermediate mark into a proofreader's mark of the proofreader's mark set selected in the fourth step and for displaying on a display section the converted proofreader's mark as a second proofreader's mark together with the document.

According to another aspect of the present invention, another embodiment is a method for proofreading a document by using a proofreading device including:
 a user attribute identification section configured to identify an attribute of a user who has logged-in the proofreading device;
 a storage section configured to store, in correspondence to the attribute of the user, a proofreader's mark set having a plurality of proofreader's marks according to a proofreader's mark rule, and configured to store an intermediate mark set including a plurality of intermediate marks each for making a plurality of proofreader's marks correspond to each other;
 a proofreader's-mark-set selection section configured to select, from proofreader's mark sets stored in the storage section, a proofreader's mark set corresponding to an attribute of an user;
 a proofreader's mark conversion section configured to convert an intermediate mark into a proofreader's mark; and
 a display section,
 the method comprising the steps of:
 (a) causing the user attribute identification section to identify an attribute of a user who has logged-in the proofreading device;
 (b) storing at least two proofreader's mark sets in the storage section, with each proofreader's mark set being in correspondence to the attribute of the user, the at least two proofreader's mark sets including:
  a first proofreader's mark set having a plurality of proofreader's marks according to a first proofreader's mark rule; and
  a second proofreader's mark set having a plurality of proofreader's marks according to a second proofreader's mark rule;
 (c) storing in the storage section an intermediate mark set including a plurality of intermediate marks for making the proofreader's marks having the same meaning among the plurality of proofreader's mark sets correspond to each other, (d) causing the proofreader's-mark-set selection section to select, from the at least two proofreader's mark sets, a proofreader's mark set corresponding to the attribute of the user identified in step (a);

(e) recognizing the first proofreader's mark added to the document by a first user, causing the proofreader's mark conversion section to convert the recognized proofreader's mark into the intermediate mark, and storing in the storage section the converted intermediate mark as a first intermediate mark, in association with the document;

(f) causing, when a second user has logged-in the proofreading device, the proofreader's-mark-set selection section to select the proofreader's mark set corresponding to the second user on the basis of an attribute of the second user;

(g) causing the proofreader's mark conversion section to convert, as a second proofreader's mark, the first intermediate mark stored in step (e) into a proofreader's mark of the proofreader's mark set selected in step (f); and (h) displaying on the display section the second proofreader's mark converted in step (g) together with the document.

BRIEF DESCRIPTION OF THE DRAWINGS

FIG. 7 is a Table showing the relationship between the intermediate marks and proofreader's marks;

FIG. 9 is a diagram showing examples of proofreader's marks.

BRIEF DESCRIPTION OF THE DRAWINGS

Figure 8:
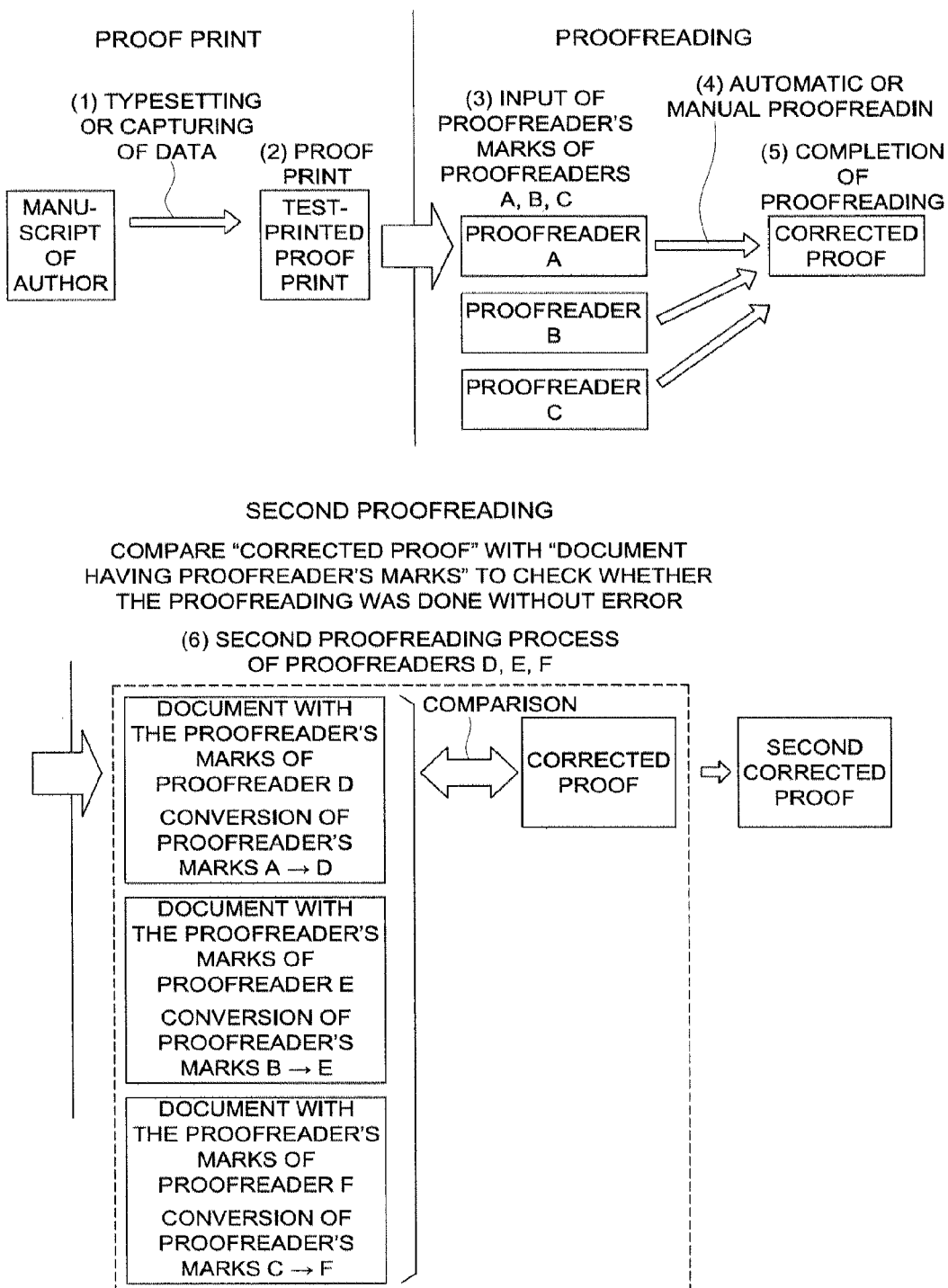
FIG. 8 is a diagram showing the proofreading procedures.

As shown in FIG. 8, when publications such as books are to be published, the manuscript created by an author is subjected to the step of typesetting, or the manuscript data is captured and converted into electronic data. After proof printing, this document (proof print) is checked by the proofreader, and proofreader's marks are used on the locations of correction. These proofreader's marks are used to perform automatic or manual proofreading, whereby corrected document is created. Then the document filled with proofreader's marks is compared with the corrected document by a proofreader for the second proofreading different from the first proofreader to check if the first proofreading is correct or not. This is followed by a step of printing the second corrected proof.

As shown in FIG. 9, proofreader's marks are based on various forms of independent rules. Proofreader's marks to be used for proofreading differ according to the rule. If there is any difference between the rule used by the first proofreader and that used by the proofreader for the second proofreading, the proofreader for the second proofreading is required to recognize the proofreader's marks according to the rule used by the first proofreader. This requires the proofreader for the second proofreading to have a high degree of skills. In addition, much time is required for the proofreading process, and errors are more likely to occur.

Further, if the proofreader is changed in the middle of the proofreading process, and a new proofreader employed the proofreader's marks according to the rule different from that of the first proofreader, the proofreader for the second proofreading is required to read the proofreader's marks of different rule from the middle of the document although he proofreads the same document. As a result, much time is required for the second proofreading process and errors are more likely to occur. Further, when the proofreader for the second proofreading is changed in the middle of the second proofreading, a succeeding proofreader for the second proofreading has to understand the proofreader's marks used by the preceding proofreader for the second proofreading, in addition to the proofreader's marks used by the proofreader for the proofreading. Thus, the aforementioned problems will be more serious.

One embodiment of the present invention performs a control of the following procedure to ensure that reliable second proofreading is achieved by a proofreader for the second proofreading even when a plurality of proofreader's marks according to a plurality of rules are used: At the time of proofreading process, proofreader's marks put on the document by a proofreader are recognized and are converted into intermediate marks, which are associated with the document and are stored in the memory. At the time of second proofreading process, these intermediate marks are converted into proofreader's marks compatible with a proofreader for the second proofreading, and these marks are displayed together with the document under the control of this embodiment.

To put it more specifically, in a proofreading device in which proofreader's marks can be entered by hand writing, a plurality of proofreader's mark set based on a plurality of proofreader's mark rules are stored in correspondence to user attributes. In addition, the information (intermediate mark set) for placing the proofreader's marks that have the same content of proofreading (meaning of a proofreader's mark) among a plurality of proofreader's mark sets in correspondence to each other. When the proofreader's marks have been added to the document, the proofreader's marks are recognized on the basis of the proofreader's mark set corresponding to the user attribute of the proofreader. These proofreader's marks are then converted into the intermediate marks, which are stored in association with the document. Further, when the document containing the inputted proofreader's marks is to be browsed, the intermediate marks are converted into the proofreader's mark compatible to the viewer (the proofreader for a second proofreading), and the converted proofreader's mark is displayed together with the document.

Even when a plurality of proofreader's marks according to different rules are used, this procedure allows the proofreader for the second proofreading to utilize the proofreader's marks appropriate to himself. Thus, reliable second proofreading process is ensured without relying on the skills of the proofreader for the second proofreading. This provides a proofreading device characterized by a high degree of versatility.

Further, even when a proofreader has proofread by using the proofreader's marks according to the rule different from that used by a proofreader for the second proofreading, this procedure allows the proofreader for the second proofreading to start the second proofreading process on the basis of the proofreader's marks familiar to him. This enhances the quality of the proofreading process and the second proofreading process.

Figure 1:
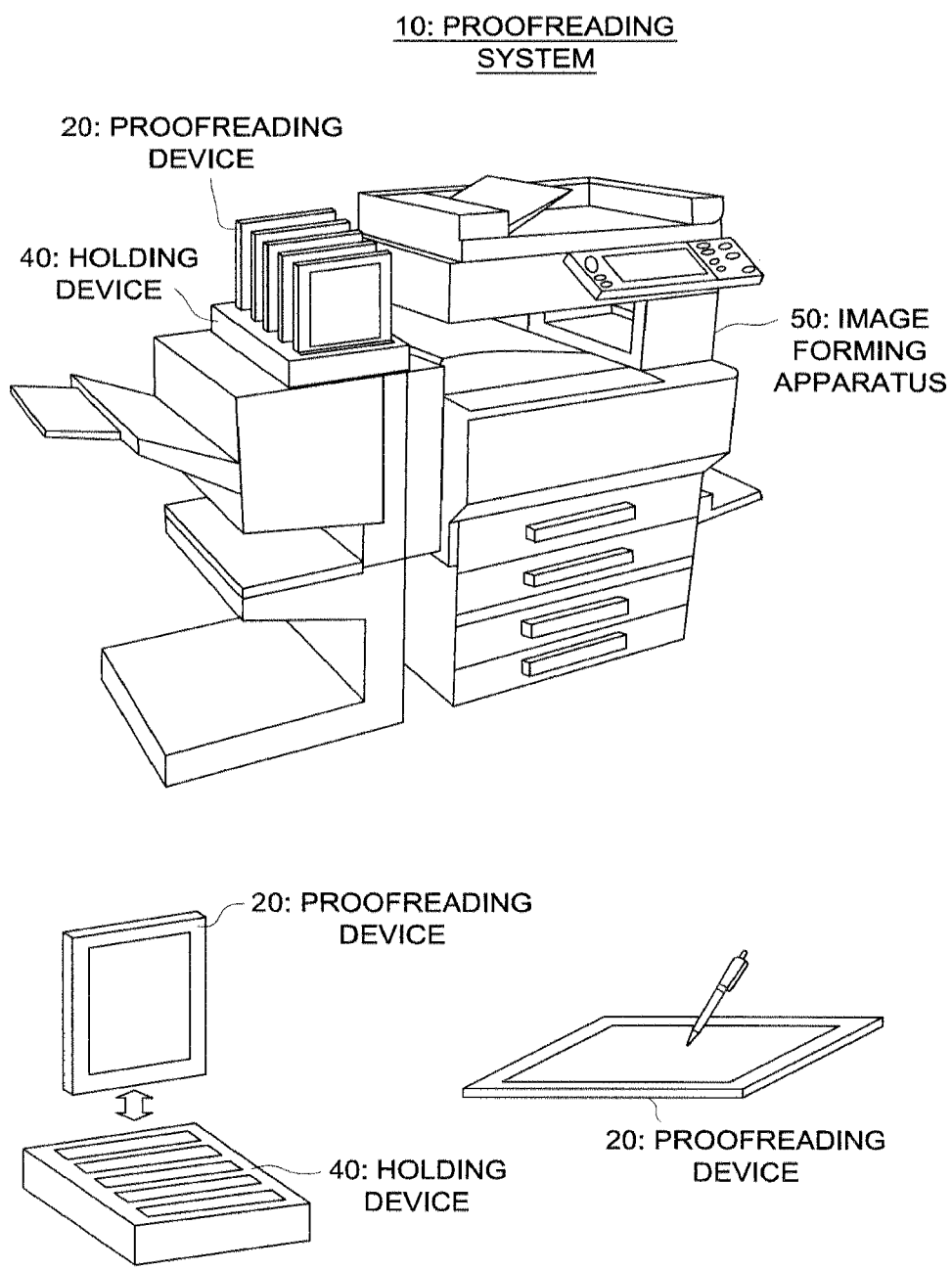
FIG. 1 is a perspective view schematically showing the structure of a proofreading system of an embodiment according to the present invention.
Figure 2:
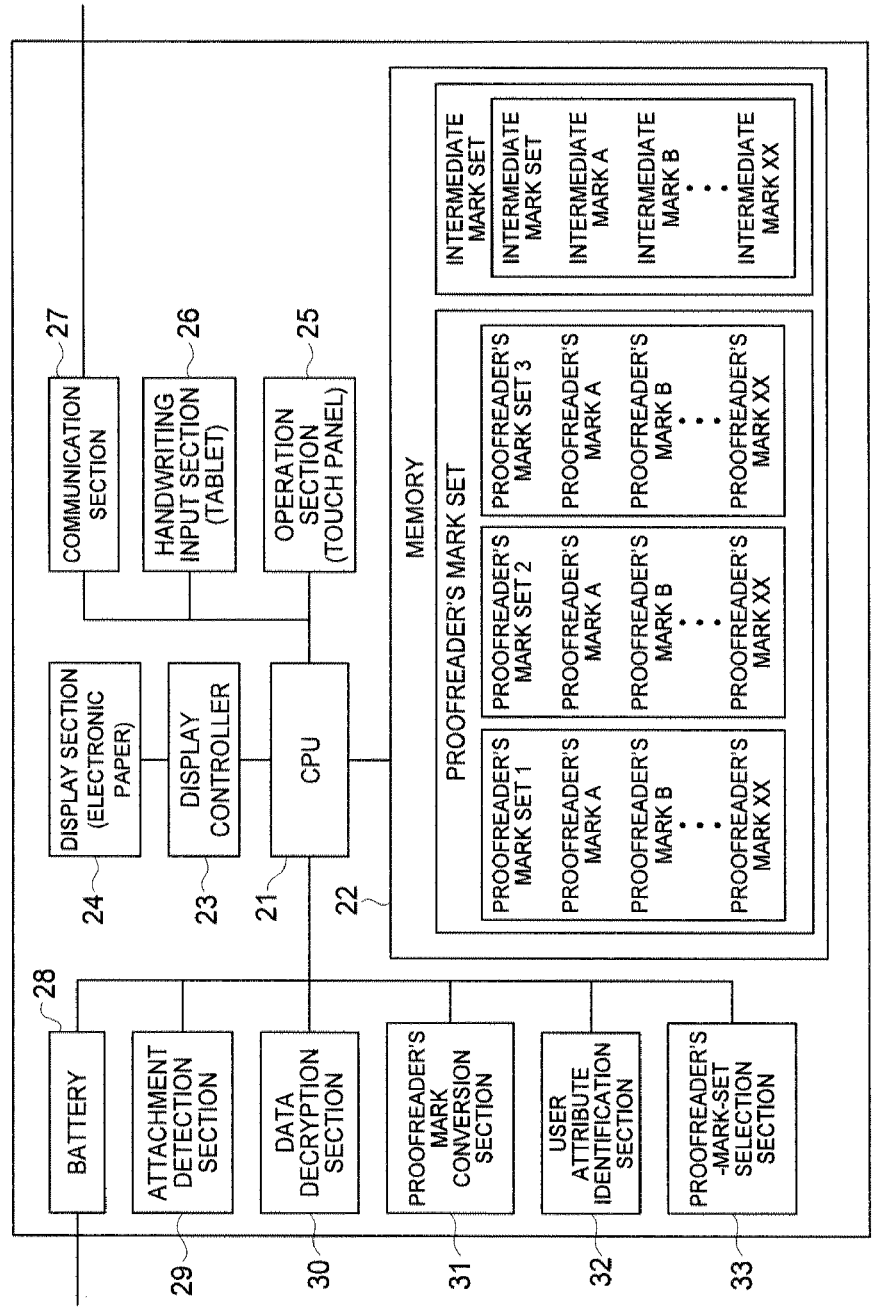
FIG. 2 is a block diagram showing the structure of a proofreading device of an embodiment according to the present invention.
Figure 3:
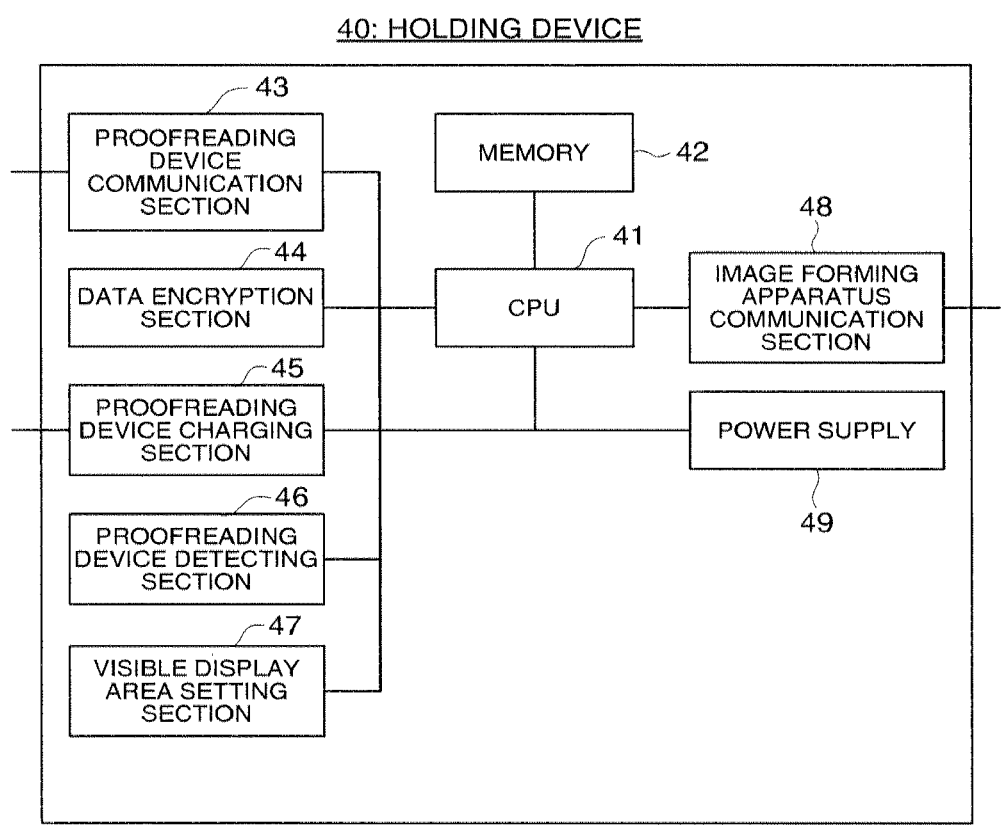
FIG. 3 is a block diagram showing the structure of a holding device of an embodiment according to the present invention.
Figure 4:
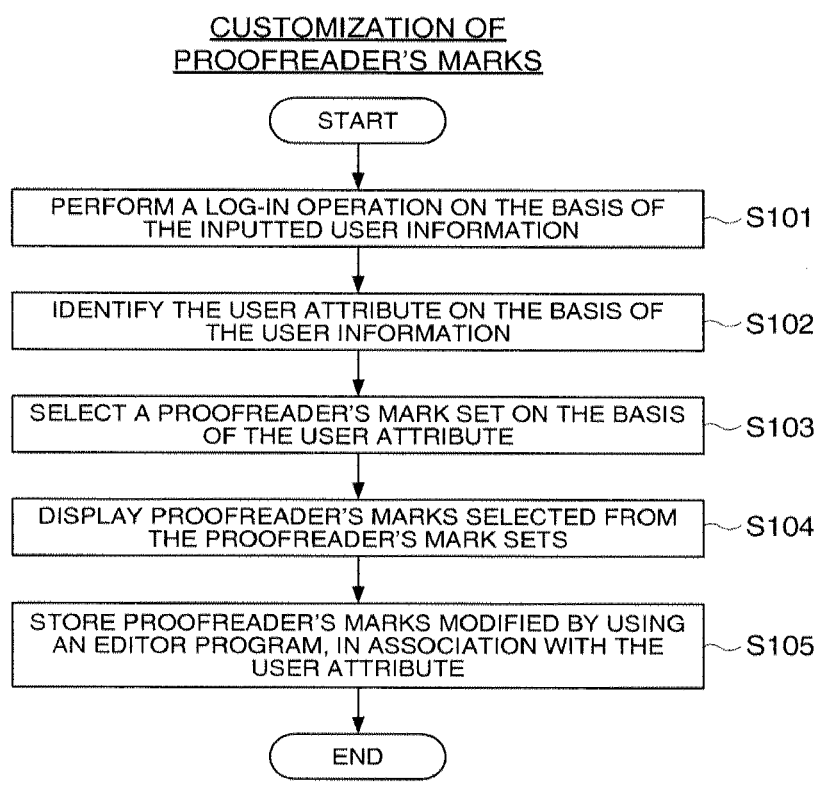
FIG. 4 is a flow chart representing the operation (customization of the proofreader's marks) of the proofreading device of an embodiment according to the present invention.
Figure 5:
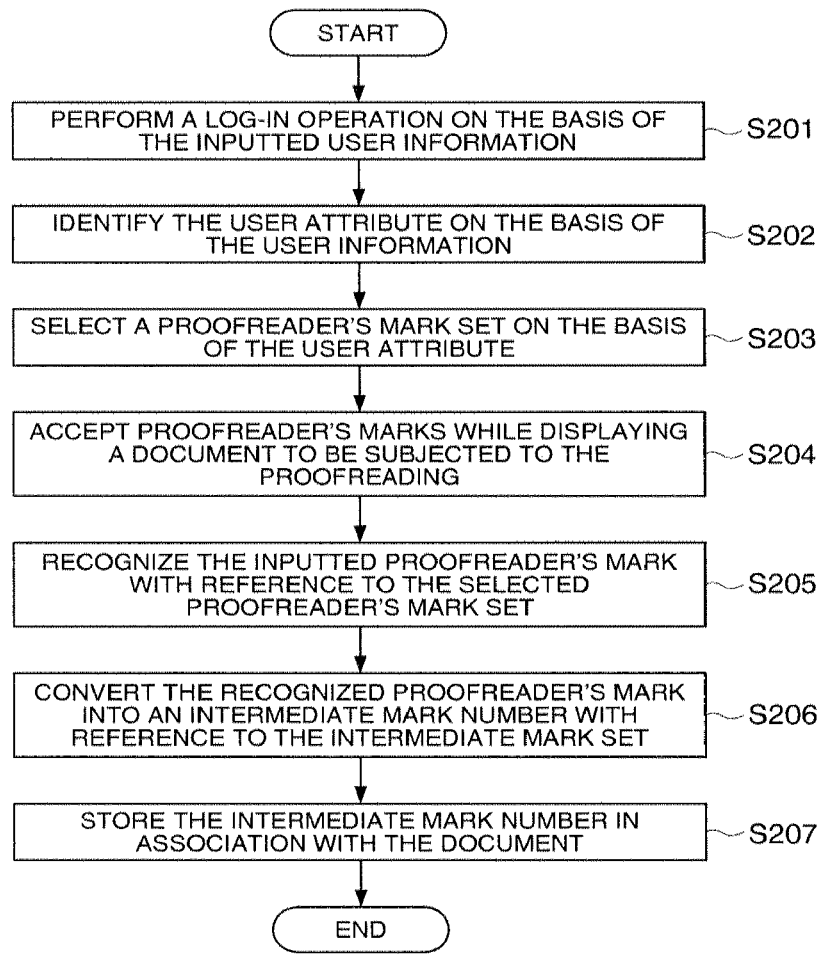
FIG. 5 is a flow chart representing the operations (proofreading) of the proofreading device of an embodiment according to the present invention.
Figure 6:
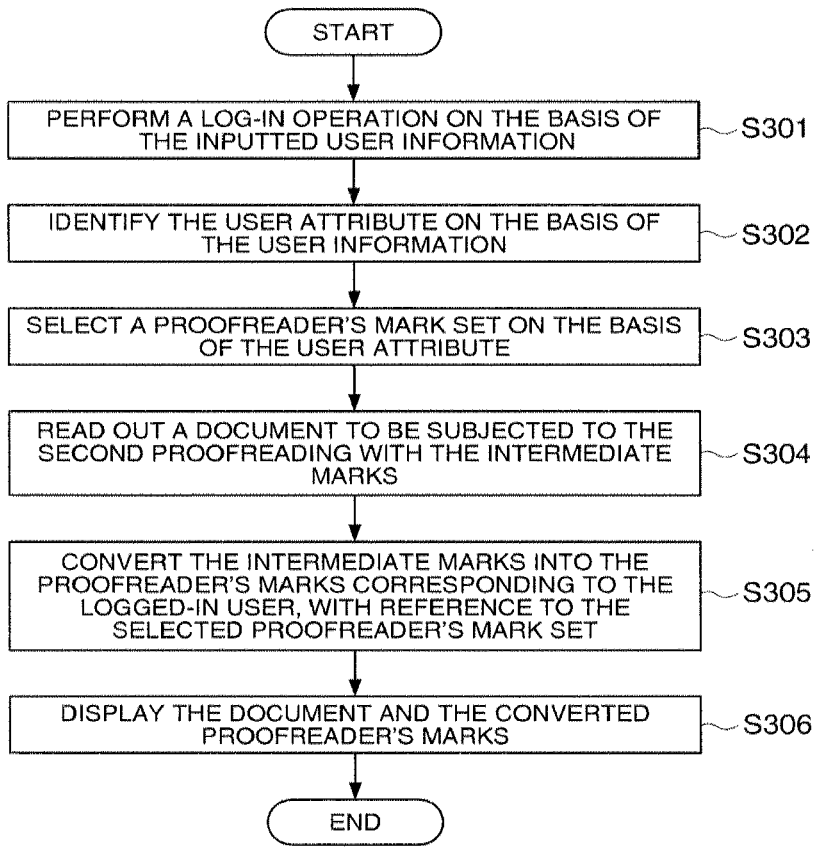
FIG. 6 is a flow chart representing the operations (second proofing) of the proofreading device of an embodiment according to the present invention.

To describe the aforementioned embodiment of the present invention in more details, the following describes the proofreading device and proofreading control program of an embodiment according to the present invention with reference to FIGS. 1 through 7. FIG. 1 is a perspective view schematically showing the structure of a proofreading system of the present embodiment. FIG. 2 is a block diagram showing the structure of a proofreading system of an embodiment according to the present invention. FIG. 3 is a block diagram showing the structure of a holding device. FIGS. 4 through 6 are flow charts representing the operation of the proofreading device of the present embodiment. FIG. 7 is a Table showing the relationship between the intermediate marks and proofreader's marks.

As shown in FIG. 1, the proofreading system 10 of this embodiment includes: a proofreading device 20 (in this embodiment, an information display device equipped with a display section) for document proofreading process and second proofreading process; a holding device 40 for removably holding the proofreading device 20; and a device for mounting the holding device 40 (in this embodiment, an image forming apparatus 50 for printing a proof print, corrected proof and second corrected proof).

In the present embodiment, the information display device is used as a proofreading device 20. The proofreading device 20 can be any device as long as it allows proofreader's marks to be inputted during a proofreading process, and permits proofreader's marks to be displayed during a second proofreading process. For example, a computer device can be used as the proofreading device 20. If there is no need of printing a proof, corrected proof or second corrected proof, the image forming apparatus 50 can be omitted. Further, if the proofreading device 20 is capable of direct data communication with the image forming apparatus 50, the holding device 40 can be omitted. The following describes the details of the proofreading device 20 and the holding device 40:

[Proofreading Device]

The proofreading device 20 is equipped with a display device such as electronic paper, electronic book, and low-profile computer. As shown in FIG. 2, the proofreading device 20 includes a CPU (Central Processing Unit) 21, a memory 22, a display controller 23, a display section (electronic paper) 24, an operation section (touch panel) 25, a handwriting input section (tablet) 26, a communication section 27, a battery 28, a attachment detection section 29, a data decryption section 30, a proofreader's mark conversion section 31, a user attribute identification section 32, and a proofreader's-mark-set selection section 33.

The CPU 21 executes various forms of programs read out of the memory 22, and controls the operations of various sections. The memory 22 includes a ROM (Read Only Memory) and RAM (Random Access Memory), and stores various forms of data such as the programs to be run on the CPU 21, setting information for controlling the operation of the proofreading device 20, user information for log-in operation, document data displayed on the display section 24, and display data constituting the display screen image. The control section includes the CPU 21 and the memory 22.

What the memory 22 stores includes a plurality of proofreader's mark sets (the drawing shows proofreader's mark sets 1 through 3) being in correspondence to the information for identifying the user or user group (called the user attribute) and the intermediate mark sets used for placing the proofreader's marks that have the same content of proofreading (meaning of a proofreader's mark) among a plurality of proofreader's mark sets in correspondence to each other. The user attribute includes information indicating a country including the country where the user lived, information indicating a company including the company which the user worked for, and information indicating the user.

The display controller 23 drives the display section 24 and controls the display. The display section 24 is made up of an electronic paper (EPD: Electrophoretic Display) in which display operation is performed by moving the particles floating in a transparent liquid by means of electric field loads; an LCD (Liquid Crystal Display); or an organic EL (electroluminescence) display device; and displays thereon the document (proof print) prior to proofreading and corrected proof.

The operation section 25 includes buttons, switches, and a pressure sensitive touch panel in which transparent electrodes are arranged in a grid pattern on the display section 24. On the touch panel, the XY coordinates of the point of force application when pressed with a finger or touch pen are detected in terms of the voltage value. The detected position signal is sent to the CPU 21 as an operation signal.

The handwriting input section 26 includes a tablet for outputting, as electronic data, the trace entered on the display section 24 (proofreader's marks in this case). It should be noted, however, that there is no particular restriction to the method for specifying the position on the display section 24. For example, it is possible to use the method for specifying the position on the display section 24 by recognizing symbol patterns (e.g., Anoto (registered trademark) pattern) displayed on the display section 24, or by communicating with devices mounted at a prescribed positions on the periphery of the display section 24. Although a handwriting input section 26 is provided separately from the operation section 25 in this embodiment, if the operation section 25 is capable of specifying the trace entered on the display section 24, the handwriting input section 26 can be omitted. Further, in the present embodiment, the proofreader's marks are inputted by the handwriting input section 26. However, the proofreader's marks can be written on a sheet of paper printed with the document, and this sheet is read by a scanner, and the proofreader's marks can be inputted. In this case, the handwriting input section 26 can be omitted.

The communication section 27 is an interface for a connection with the holding device 40, and establishes communication with the holding device 40 by wired communication, wireless communication, infrared communication, or Bluetooth (registered trademark), whereby transmission/reception of the document data and display data is achieved.

The battery 28 is charged by the electric power supplied from the proofreading device charging section of the holding device 40, and supplies electric power for driving various sections of the proofreading device 20.

The attachment detection section 29 detects that the proofreading device 20 is attached to the holding device 40. There is no particular restriction to the method for the detection. For example, attachment of the proofreading device 20 can be detected by checking whether the battery 28 is connected with the proofreading device charging section of the holding device 40, or by examining whether the electrode arranged on the proofreading device 20 is electrically connected with the electrode arranged on the holding device 40. Installation of the proofreading device 20 can also be detected by mounting electric contacts capable of making contact or breaking by its own weight on the bottom of the proofreading device 20 and by checking whether these electric contacts are in contact or open.

If the document data sent from the image forming apparatus 50 through the holding device 40 has been encrypted, this data is decrypted back by the data decryption section 30 into the data that can be displayed on the display section 24.

The proofreader's mark conversion section 31 recognizes the proofreader's marks inputted through the handwriting input section 26 with reference to the proofreader's mark set corresponding to the user attribute of the logged-in proofreader; converts the proofreader's marks to the intermediate marks with reference to the intermediate mark set; and store the intermediate marks in the memory 22 in association with the document data. In addition, The proofreader's mark conversion section 31 converts the intermediate marks stored in the memory 22 to the proofreader's marks corresponding to the logged-in proofreader for the second proofreading, with reference to the proofreader's mark set corresponding to the user attribute of the logged-in proofreader for the second proofreading; and displays the converted proofreader's marks together with the document on the display section 24.

The user attribute identification section 32 identifies the user attribute on the basis of the user information such as a user ID and password having been inputted through the operation section 25.

The proofreader's-mark-set selection section 33 selects the proofreader's mark set corresponding to the user attribute identified by the user attribute identification section 32, out of a plurality of proofreader's mark sets stored in the memory 22.

In FIG. 2, the proofreader's mark conversion section 31, the user attribute identification section 32, the proofreader's-mark-set selection section 33 are illustrated as hardware. However, a proofreading control program can be configured to allow the control section (CPU 21) to function as the proofreader's mark conversion section 31, the user attribute identification section 32, the proofreader's-mark-set selection section 33, so that the proofreading control program is run on the control section (CPU 21).

[Holding Device]

The holding device 40 is provided with the functions of holding the proofreading device 20, establishing data communication with the proofreading device 20, and charging the battery 28 of the proofreading device 20. The holding device 40 is fixed on the main body of the image forming apparatus 50 or its accessory (e.g., sheet feeder or finisher installed separately from the main body).

As shown in FIG. 3, this holding device 40 includes a CPU 41, a memory 42, a proofreading device communication section 43, a data encryption section 44, a proofreading device charging section 45, a proofreading device detecting section 46, a visible display area setting section 47, an image forming apparatus communication section 48, and a power supply 49.

The CPU 41 executes various forms of programs read out of the memory 42, and controls the operations of various sections. The memory 42 is made up of a ROM, RAM and others, and stores various forms of programs executed on the CPU 41, the setting information for controlling the operation of the holding device 40, and various forms of data such as document data to be displayed on the proofreading device 20. The control section includes the CPU 41 and memory 42.

The proofreading device communication section 43 constitutes an interface for a connection with one or more of the proofreading devices 20, and establishes a communication with each proofreading device 20 by wired communication, wireless communication, infrared communication, or Bluetooth (registered trademark).

If required, the data encryption section 44 encrypts the document data obtained from the image forming apparatus 50.

The proofreading device charging section 45 supplies the electric power of the power supply 49 to the battery 28 of one or more of the proofreading devices 20 so that the battery 28 is charged.

The proofreading device detecting section 46 detects the attachment of the proofreading device 20, and when a plurality of proofreading devices 20 are mounted, identifies which of the proofreading devices 20 is visible from the position of the user facing them. There is no particular restriction to the method for attaching the proofreading device 20 and the method for detecting the position. For example, the attachment or position can be detected by checking whether the proofreading device charging section 45 is connected with the battery 28 of the proofreading device 20, or by examining whether the electrode arranged on each slot of the holding device 40 is electrically connected with the electrode arranged on the proofreading device 20. Attachment or position can also be detected by mounting electric contacts capable of making contact of breaking by the own weight of the proofreading device 20 on the bottom of each holding device 40, and by checking whether these electric contacts are in contact or open.

In conformity to the structure of the holding device 40 and the proofreading device 20, the visible display area setting section 47 sets the region of the display section 24 of the proofreading device 20 exposed from the holding device 40.

The image forming apparatus communication section 48 constitutes an interface for a connection with the image forming apparatus 50 and establishes communication with the image forming apparatus 50 by wired communication, wireless communication, infrared communication, or Bluetooth (registered trademark), whereby transmission/reception of the document data and display data is achieved.

The power supply 49 supplies electric power for deriving each section of the holding device 40.

The following describes the operation of the proofreading device 20 having the aforementioned structure. In the first place, referring to the flow chart of FIG. 4, the following describes the procedure in which each user customizes and registers the proofreader's mark set.

The user operates the operation section 25 of the proofreading device 20 to input the user information such as a user ID and a password. Based on the inputted user information, the control section performs a log-in operation (S101).

On the basis of the user information, the user attribute identification section 32 identifies the user attribute (S102), and the proofreader's-mark-set selection section 33 selects the proofreader's mark set corresponding to the use attribute from a plurality of proofreader's mark sets stored in the memory 22 (S103).

When the user has selected the number assigned to the proofreader's mark to be corrected from the proofreader's mark set, the control section causes the display section 24 to display the proofreader's mark corresponding to the selected number assigned to the proofreader's mark (S104). When the user has corrected the proofreader's marks or inputted a new proofreader's mark by using an editor program or the like, the control section stores in the memory 22 the corrected or inputted proofreader's mark in association with the user attribute as a new proofreader's mark set (S105).

Referring to the flow chart of FIG. 5, the following describes the proofreading procedure using the customized proofreader's mark set according to the aforementioned technique:

Similarly to the aforementioned case, the user operates the operation section 25 of the proofreading device 20 to input the user information. On the basis of the inputted user information, the control section performs the log-in operation (S201), and the user attribute identification section 32 identifies the user attribute on the basis of the user information (S202), and the proofreader's-mark-set selection section 33 selects the proofreader's mark set corresponding to the user attribute (S203).

Then the control section causes the display section 24 to display the document (proof print) to be proofread, and allows the user to input the proofreader's marks through the handwriting input section 26 (S204). Here the display section 24 is caused to display the document to be proofread and the user is allowed to input the proofreader's marks through the handwriting input section 26. However, it is also possible to arrange such a configuration that the user can write proofreader's marks on the proof print having been printed by the image forming apparatus 50, and then the proof print containing the proofreader's marks is read by a scanner or the like.

Referring to the proofreader's mark set selected in Step S203, the proofreader's mark conversion section 31 recognizes the inputted proofreader's marks (S205). After that, referring to the intermediate mark set, the proofreader's mark conversion section 31 converts the recognized proofreader's mark into the intermediate mark number of the intermediate mark set (S206).

For example, as shown in FIG. 7, if the proofreader's marks in a plurality of proofreader's mark sets are arranged according to the contents of proofreading (meaning of the proofreader's marks) and the number (intermediate mark number) is assigned to each of the proofreading contents, the proofreader's mark set to be used by the proofreader corresponds to the proofreader's mark set 1 in FIG. 9. In the cases where the inputted proofreader's mark indicates "Insert a space between the characters", the mark is converted to "2" which is an intermediate mark number corresponding to that proofreader's mark.

The proofreader's mark conversion section 31 stores the positional information of the proofreader's marks and the intermediate mark number corresponding thereto, in association with the document, in the memory 22, memory 42 of the holding device 40, or memory section of the image forming apparatus 50 (S207).

Here, numerals are used as intermediate marks. However, without being restricted to numerals, any information can be used as long as it can be associated with proofreader's marks. In the aforementioned flow, the proofreader logs in, and the proofreader's mark set of that proofreader is selected, depending on the user attribute, and the proofreader's mark is recognized with reference to the proofreader's mark set having been selected and is converted into the intermediate mark, as described above. However, it is also possible to arrange such a configuration that the proofreader's mark is recognized with reference to all the proofreader's mark sets and is then converted into the intermediate mark. In this case, the Steps S201 through S203 can be omitted.

Referring to the flow chart of FIG. 6, the following describes the second proofreading procedure by using the document and intermediate marks stored in the aforementioned flow:

Similarly to the above, when the user operates the operation section 25 of the proofreading device 20 to input the user information, the control section performs a log-in operation, depending on the inputted user information (S301). Based on the user information, the user attribute identification section 32 identifies the user attribute (S302), and the proofreader's-mark-set selection section 33 selects the proofreader's mark set corresponding to the user attribute (S303).

The proofreader's mark conversion section 31 reads the document to be proofread secondary and the intermediate marks and position information corresponding to that document out of the memory 22, memory 42 of the holding device 40 or memory section of the image forming apparatus 50 (S304). According to the proofreader's mark set selected by the proofreader's-mark-set selection section 33, the proofreader's mark conversion section 31 converts each of the intermediate marks into the proofreader's marks of the relevant proofreader's mark set (S305).

In the correspondence relationship given in FIG. 7, in the case that the proofreader's mark set used by the proofreader for the second proofreading corresponds to the proofreader's mark set 2 of FIG. 9 and the intermediate mark is "2", the mark is converted to "#" which is the proofreader's mark corresponding to that intermediate mark.

The above description assumes the presence of proofreader's marks corresponding to intermediate marks. However, the proofreader's marks corresponding to some intermediate marks may not be present. In such a case, the proofreader's mark conversion section 31 can display intermediate marks instead of proofreader's marks, the information indicating the absence of the proofreader's marks corresponding to those intermediate marks, or the information representing the meaning of the those proofreader's marks. It is also possible to display the proofreader's marks of other proofreader's mark sets that can be converted from those intermediate marks. Further, to ensure that a similar problem will not arise in the next second proofreading process, it is also possible to make such an arrangement that the proofreader's mark conversion section 31 displays on the display section 24 a list of the proofreader's marks of the proofreader's mark set from which those intermediate marks have been converted so that the proofreader's marks can be customized.

The proofreader's mark conversion section 31 displays on the display section 24 the proofreader's marks converted from the intermediate marks by superimposing them on the document for the second proofreading (S306). Then the proofreader for the second proofreading performs the proofreading process by comparing the corrected proof with the proofreader's marks displayed on the display section 24.

As described above, in the proofreading process, the proofreading device (proofreading control program) recognizes the proofreader's marks inputted by the logged-in proofreader and converts them into the intermediate marks. These intermediate marks are memorized in association with the document, and in the second proofreading process. the intermediate marks are converted into the proofreader's marks corresponding to the logged-in proofreader for the second proofreading and are displayed together with the document. Thus, this arrangement ensures a reliable second proofreading process without relying on the skills of a proofreader for the second proofreading, even if there are a plurality of proofreader's marks based on different rules.

It is to be expressly understood, however, that the present invention is not restricted to the aforementioned embodiments. The configuration and control may be modified as required without departing from the spirit and scope of the invention claimed.

For example, one and the same proofreading device 20 is used for both the proofreading and the second proofreading in the aforementioned embodiments. However, it is also possible to use different proofreading devices 20 for the proofreading and the second proofreading. In this case, in the proofreading procedure, the proofreading device 20 can store a pre-proofreading document and intermediate marks in association with each other, in an external device (e.g., the holding device 40 and the image forming apparatus 50). At the time of second proofreading, the proofreading device 20 can read the pre-proofreading document and the intermediate marks from the external device.

INDUSTRIAL APPLICABILITY

The present invention can be applied to a proofreading device in which the proofreader's marks can be inputted and displayed, and to a proofreading control program capable of being executed on that proofreading device.

What is claimed is:

1. A proofreading device to which proofreader's marks are able to be input, the proof reading device comprising:
    a display section configured to display a document;
    a user attribute identification section configured to identify an attribute of a user who has logged in the proofreading device;
    a storage section configured to store:
        at least two proofreader's mark sets, with each proofreader's mark set being in correspondence to the attribute of the user, the at least two proofreader's mark sets including:
        a first proofreader's mark set which has a plurality of proofreader's marks according to a first proofreader's mark rule; and
        a second proofreader's mark set which has a plurality of proofreader's marks according to a second proofreader's mark rule different from the first proofreader's mark rule; and
        an intermediate mark set which includes a plurality of intermediate marks for making the proofreader's marks having the same meaning among the plurality of proofreader's mark sets correspond to each other;
    a proofreader's-mark-set selection section configured to select a proofreader's mark set corresponding to the attribute of the user identified by the user attribute identification section, from the at least two proofreader's mark sets; and
    a proofreader's mark conversion section configured to recognize a first proofreader's mark added to a document by a first user; then convert the first proofreader's mark into the intermediate mark, and configured to store the converted intermediate mark, as a first intermediate mark, in the storage section in association with the document, wherein when a second user has logged in the proofreading device, the proofreader's mark conversion section converts as a second proofreader's mark the stored first intermediate mark into a second proofreader's mark of the proofreader's mark set selected by the proofreader's-mark-set selection section on the basis of a attribute of the second user, and causes the display section to display the second proofreader's mark together with the document.

2. The proofreading device of claim 1, wherein the proofreader's mark conversion section stores, in accordance with the document, the first intermediate mark and positional information identifying a position on the document at which the first proofreader's mark was added, and the proofreader's mark conversion section causes the display section to display the second proofreader's mark at the position, on the document, identified by the positional information.

3. The proofreading device of claim 1, wherein the proofreader's mark conversion section causes the display section to display a list of first proofreader's marks from which the intermediate mark which has not been converted into the second proofreader's mark was converted.

4. The proofreading device of claim 1, wherein the proofreader's marks are capable of being edited, and a proofreader's mark set including an edited proofreader's mark is stored in the storage section in correspondence to the attribute of the user identified by the user attribute identification section.

5. A non-transitory computer readable recording medium storing a proofreading control program which is executed on a proofreading device, wherein the proofreading device is configured to be able to accept a proofreader's mark and stores in advance:
    at least two proofreader's mark sets including:
        a first proofreader's mark set having a plurality of proofreader's marks according to a first proofreader's mark rule; and
        a second proofreader's mark set having a plurality of proofreader's marks according to a second proofreader's mark rule, wherein each of the at least two proofreader's mark set is in correspondence to an attribute of a user; and
    a set of intermediate marks for making proofreader's marks having the same meaning among the proofreader's mark sets correspond to each other,
    the proofreading control program is for making the proofreading device execute:
    a first step for recognizing a proofreader's mark added to a document by a first user, converting the added proofreader's mark into the intermediate mark, and storing in association with the document the converted intermediate mark as a first intermediate mark;
    a second step for identifying an attribute of a logged-in second user;
    a third step for selecting a proofreader's mark set, depending on the identified attribute of the second user from the at least two proofreader's mark sets stored in advance; and
    a fourth step for converting the stored first intermediate mark into a proofreader's mark of the proofreader's mark set selected in the fourth step and for displaying on a display section the converted proofreader's mark as a second proofreader's mark together with the document.

6. The non-transitory recording medium of claim 5, wherein in the first step the first intermediate mark and positional information identifying a position on the document to which the first proofreader's mark was added are stored in association with the document, and in the fourth step the second proofreader's mark is displayed at the position, on the document, identified by the positional information.

7. The non-transitory recording medium of claim 5, wherein the proofreading control program makes the proofreading device execute:
    a fifth step for displaying on the display section a list of first proofreader's marks from which the second intermediate mark which has not been converted into the second proofreader's mark was converted.

8. The non-transitory recording medium of claim 5, wherein the proofreading control program makes the proofreading device execute:
    a sixth step for accepting edition to the proofreader's mark on the proofreading device conducted by a user who has logged-in the proofreading device; and
    a seventh step for storing a proofreader's mark set including the edited proofreader's mark in the storage section in correspondence to an attribute of the logged-in user.

9. A method for proofreading a document by using a proofreading device including:

a user attribute identification section configured to identify an attribute of a user who has logged-in the proofreading device;

a storage section configured to store, in correspondence to the attribute of the user, a proofreader's mark set having a plurality of proofreader's marks according to a proofreader's mark rule, and configured to store an intermediate mark set including a plurality of intermediate marks each for making a plurality of proofreader's marks correspond to each other;

a proofreader's-mark-set selection section configured to select, from proofreader's mark sets stored in the storage section, a proofreader's mark set corresponding to an attribute of an user;

a proofreader's mark conversion section configured to convert an intermediate mark into a proofreader's mark; and a display section, the method comprising the steps of:
 (a) causing the user attribute identification section to identify an attribute of a user who has logged-in the proofreading device;
 (b) storing at least two proofreader's mark sets in the storage section, with each proofreader's mark set being in correspondence to the attribute of the user, the at least two proofreader's mark sets including:
  a first proofreader's mark set having a plurality of proofreader's marks according to a first proofreader's mark rule; and
  a second proofreader's mark set having a plurality of proofreader's marks according to a second proofreader's mark rule;
 (c) storing in the storage section an intermediate mark set including a plurality of intermediate marks for making the proofreader's marks having the same meaning among the plurality of proofreader's mark sets correspond to each other,
 (d) causing the proofreader's-mark-set selection section to select, from the at least two proofreader's mark sets, a proofreader's mark set corresponding to the attribute of the user identified in step (a);
 (e) recognizing the first proofreader's mark added to the document by a first user, causing the proofreader's mark conversion section to convert the recognized proofreader's mark into the intermediate mark, and storing in the storage section the converted intermediate mark as a first intermediate mark, in association with the document;
 (f) causing, when a second user has logged-in the proofreading device, the proofreader's-mark-set selection section to select the proofreader's mark set corresponding to the second user on the basis of an attribute of the second user;
 (g) causing the proofreader's mark conversion section to convert, as a second proofreader's mark, the first intermediate mark stored in step (e) into a proofreader's mark of the proofreader's mark set selected in step (f); and
 (h) displaying on the display section the second proofreader's mark converted in step (g) together with the document.

10. The method of claim 9, wherein in step (e) the first intermediate mark and positional information which identifies a position on the document at which the first proofreader's mark was added are stored in the storage section in association with the document, and in step (h) the second proofreader's mark is displayed on the display section at the position, on the document, identified by the positional information.

11. The method of claim 9, comprising the step of:
 (i) displaying on the display section a list of first proofreader's marks from which the second intermediate mark which has not been converted into the second proofreader's mark was converted.

12. The method of claim 9, comprising the steps of:
 (j) accepting edition to a proofreader's mark on the proofreading device by a user who has logged in the proofreading device;
 (k) storing a proofreader's mark set including the edited proofreader's mark in the storage section in correspondence to an attribute of the logged-in user.

* * * * *